United States Patent
Yamauchi

(10) Patent No.: US 8,120,620 B2
(45) Date of Patent: Feb. 21, 2012

(54) GRAPHICS SYSTEM AND DRAWING METHOD THEREOF

(75) Inventor: Hideaki Yamauchi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 305 days.

(21) Appl. No.: 12/484,631

(22) Filed: Jun. 15, 2009

(65) Prior Publication Data

US 2009/0303240 A1    Dec. 10, 2009

Related U.S. Application Data

(63) Continuation of application No. PCT/JP2007/050446, filed on Jan. 15, 2007.

(51) Int. Cl.
*G09G 5/00* (2006.01)
(52) U.S. Cl. ........................ 345/620; 345/619
(58) Field of Classification Search .................. 345/619, 345/620, 622, 629, 545
See application file for complete search history.

(56) References Cited

U.S. PATENT DOCUMENTS

| 5,606,656 | A | 2/1997 | Yamaguchi | |
|---|---|---|---|---|
| 7,200,819 | B2 * | 4/2007 | Bells et al. | 715/815 |
| 2003/0058241 | A1 * | 3/2003 | Hsu | 345/426 |
| 2003/0216175 | A1 | 11/2003 | Osako | |

FOREIGN PATENT DOCUMENTS

| JP | 64-073476 A | 3/1989 |
|---|---|---|
| JP | 6-113106 A | 4/1994 |
| JP | 08-287265 A | 11/1996 |
| JP | 2003-331314 A | 11/2003 |

* cited by examiner

*Primary Examiner* — Kee M Tung
*Assistant Examiner* — Jacinta M Crawford
(74) *Attorney, Agent, or Firm* — Arent Fox LLP

(57) ABSTRACT

A graphics system including: a register storing data of a clipping frame of a frame buffer; a register storing offset data of a figure; a register storing data of a clipping frame of a stencil buffer that is larger than the clipping frame of the frame buffer and storing position data of a reference basing point, on a stencil buffer, for drawing a non-offset figure or an offset figure; and a pixel filling-in module for drawing onto a stencil buffer a masking determination result of a pixel relating to the figure on the basis of data of the clipping frame of the stencil buffer and the figure, and also drawing the non-offset figure or the offset figure onto the frame buffer by referring to the stencil buffer onto which the masking determination result is drawn, the position data of a reference basing point stored in the register, and the data of the clipping frame of the frame buffer.

15 Claims, 15 Drawing Sheets

| FIGURE OFFSETTING AMOUNT AND OFFSETTING DIRECTION (REPRESENTED BY ARROWS) | VARIATION OF COORDINATE VALUES AT FOUR CORNERS OF CLIPPING FRAME FROM NORMAL POSITION | | | | VARIATION FROM NORMAL VALUES OF FRAME BUFFER REGISTER (OR VIRTUAL CLIPPING FRAME REGISTER) | | |
|---|---|---|---|---|---|---|---|
| | UPPER LEFT | LOWER LEFT | UPPER RIGHT | LOWER RIGHT | STANDARD POINT COORDINATES | WIDTH | HEIGHT |
| dx > 0, dy > 0 (↘) | -dx, -dy | -dx, 0 | 0, -dy | 0, 0 | -dx, -dy | \|dx\| | \|dy\| |
| dx > 0, dy < 0 (↗) | -dx, 0 | -dx, -dy | 0, 0 | 0, -dy | -dx, 0 | \|dx\| | \|dy\| |
| dx < 0, dy > 0 (↙) | 0, -dy | 0, 0 | -dx, -dy | -dx, 0 | 0, -dy | \|dx\| | \|dy\| |
| dx < 0, dy < 0 (↖) | 0, 0 | 0, -dy | -dx, 0 | -dx, -dy | 0, 0 | \|dx\| | \|dy\| |

FIG. 8 ated by the solid line represents the screen size 66. Also, on a frame buffer 73 of a frame buffer size 72, in which a main body 70 and a shadow 71 of the figure are drawn, the frame drawn by the dashed-dotted line 67 and the frame drawn by the dashed line 68 respectively represent a partial area (also referred to as a window size) and the clipping frame size.

GRAPHICS SYSTEM AND DRAWING METHOD THEREOF

CROSS-REFERENCE TO RELATED APPLICATIONS

This application is a continuation application of International PCT Application No. PCT/JP2007/50446 which was filed on Jan. 15, 2007.

FIELD

The present invention relates to a graphics system and a drawing method thereof, and particularly to a graphics system and a drawing method thereof for performing a process of multiple drawing in which identical subjects of drawings are drawn offset by a prescribed distance.

BACKGROUND

A graphics system is sometimes used for performing a process of multiple drawing in which identical figures are drawn offset by a very short distance. A typical example of this is illustrated in FIG. 9, in which the shadow of a two-dimensional figure is expressed; it is often employed to draw maps for, for example, car navigation systems and the like.

Here, a drawing method by which the shadow of a two-dimensional figure is expressed, as in FIG. 9, will be explained by referring to FIG. 10. As illustrated in FIG. 10, a drawing mechanism 51 in a graphics system draws, onto a stencil buffer 52, a result of determination of whether or not a pixel is included in the target figure (masking determination result) (step 1). Specifically, the pixels that are included only in the figure are filled in. A figure 53 made of the filled-in pixels is also referred to as a stencil mask figure. Next, the stencil buffer 52 is referred to, and a main body 54 of the figure and a shadow 55 of the figure are drawn onto a frame buffer 56 while taking into consideration the positional relationship between the pixels (step 2).

A stencil buffer is a buffer for storing information representing whether permission to draw figures, in units of pixels, should be given. Drawing methods in which stencil buffers are used have spread widely as one of the methods of drawing complicated shapes having concavities.

However, in this type of drawing method, stencil buffers and frame buffers (resolution in a screen) are limited in size, and accordingly, a clipping process is performed in order to prevent the drawing of pixels in a place outside of the boundaries. However, when the shadow of a figure on a clipping boundary is drawn offset onto a frame buffer while referring to a stencil buffer, the clipped edge shifts inwardly in the screen so that a shadow 57, which is partially lacking as illustrated in FIG. 11, is generated.

When a frame buffer size is not smaller than the screen size, an area is provided to a frame buffer 58 as a margin for offsetting the shadow so that a frame buffer size 60 (this serves also as a clipping frame size) greater than an screen size 59 is secured, and thereby a main body 64 and a shadow 65 of the figure can be correctly drawn with the margin pushed out of the screen. By this method, the problem can be solved on the surface. Note that, in FIG. 12, the frame drawn by the dashed line in the stencil buffer 62 onto which a stencil mask figure 61 has been drawn represents a stencil buffer size 63 (this is also the clipping frame size), and the frame drawn by the solid line represents the screen size 59.

However, when a figure is to be drawn only in a partial area 67 that is smaller than a screen size 66 as illustrated in FIG. 13, the clipping area (the area in a clipping frame 68) is entirely within the screen so that unnecessary part prepared as a margin is drawn and unnecessary pieces 69 are drawn, and this makes it impossible to use the above kind of drawing methods. Note that the frame drawn by the solid line represents the screen size 66. Also, on a frame buffer 73 of a frame buffer size 72, in which a main body 70 and a shadow 71 of the figure are drawn, the frame drawn by the dashed-dotted line 67 and the frame drawn by the dashed line 68 respectively represent a partial area (also referred to as a window size) and the clipping frame size.

Besides the graphics systems as explained above, for example, Patent Document 1 discloses a graphics system used as a game machine that performs a shadow creation process in a virtual three-dimensional space in a game. Patent Document 2 discloses a graphics system used as an information processing apparatus that performs a clipping process on figures having a prescribed width, such as line segments.

In view of the above problems, it is an object of the present invention to provide a graphics system and a drawing method thereof that can prevent the chipping of a portion of a figure and the drawing of unnecessary portions of a figure in the process of multiple drawing in which identical drawing subjects are drawn offset by a prescribed distance in a shadow expressing process for two-dimensional figures.

Patent Document 1:
Japanese Laid-open Patent Publication No. 2003-331314
Patent Document 2:
Japanese Laid-open Patent Publication No. 08-287265

SUMMARY

A graphics system according to the first aspect of the invention is a graphics system that performs a process of multiple drawing in which identical drawing subjects are drawn offset by a prescribed distance, including: frame buffer clipping frame data storage means for storing frame buffer clipping frame data defining a clipping frame of a frame buffer; offset data storage means for storing offset data defining an offsetting direction and an offsetting amount of the drawing subject; stencil buffer clipping frame data storage means for storing stencil buffer clipping frame data defining a clipping frame that is a clipping frame of a stencil buffer and that is larger than the clipping frame of the frame buffer; position data storage means for storing position data of a position functioning as a reference basing point, on the stencil buffer, for drawing the non-offset drawing subject or the offset drawing subject onto the frame buffer; first drawing means for drawing a masking determination result of a pixel relating to the drawing subject onto the stencil buffer on the basis of the drawing subject and the stencil buffer clipping frame data; and second drawing means for drawing the non-offset drawing subject or the offset drawing subject onto the frame buffer by referring to the stencil buffer onto which the first drawing means drew the subject, the position data, and the frame buffer clipping frame data.

The above configuration makes it possible to perform the process of multiple drawing in which identical drawing subjects are drawn offset, without drawing omitted portions or drawing unnecessary portions by securing a clipping frame of a stencil buffer that is larger than the clipping frame of the frame buffer according to the offsetting amount and the offsetting direction of the drawing subject, by drawing the non-offset drawing subject on the basis of the position data of the reference basing point, on the stencil buffer, for drawing the non-offset drawing subject, and by drawing the offset drawing subject on the basis of the position data of the reference basing point, on the stencil buffer, for drawing the offset drawing subject.

A graphics system according to the second aspect of the invention is a graphics system that performs the process of multiple drawing in which identical drawing subjects are drawn offset by a prescribed distance, including: virtual clipping frame data storage means for storing virtual clipping frame data defining a virtual clipping frame of a frame buffer; offset data storage means for storing offset data defining an offsetting direction and an offsetting amount of the drawing subject; common clipping frame data storage means for storing common clipping frame data defining a clipping frame that is common to the frame buffer and the stencil buffer and that is larger than the virtual clipping frame; scope data storage means for storing scope data of a scope functioning as a reference scope, on the stencil buffer, for drawing the non-offset drawing subject or the offset drawing subject onto the frame buffer; first drawing means for drawing a masking determination result of a pixel relating to the drawing subject onto the stencil buffer on the basis of the drawing subject and the common clipping frame data; and second drawing means for drawing the non-offset drawing subject or the offset drawing subject onto the frame buffer by referring to the stencil buffer onto which the first drawing means drew the subject, the scope data, and the virtual clipping frame data.

The above configuration makes it possible to perform the process of multiple drawing in which identical drawing subjects are drawn offset, without drawing omitted portions or drawing unnecessary portions by securing a common clipping frame that is larger than a virtual clipping frame according to the offsetting amount and the offsetting direction of the drawing subject, by drawing the non-offset drawing subject on the basis of the scope data of the reference scope for drawing the non-offset drawing subject, and by drawing the offset drawing subject on the basis of the scope data of the reference scope for drawing the offset drawing subject.

The invention can be configured not only as the graphics systems in the above aspects, but also as a drawing method for graphics systems.

BRIEF DESCRIPTION OF DRAWINGS

The present invention will be explained more clearly by the following detailed descriptions with references to the drawings.

FIG. 8 explains a manner of expanding a clipping frame;

DESCRIPTION OF EMBODIMENTS

Figure 1:
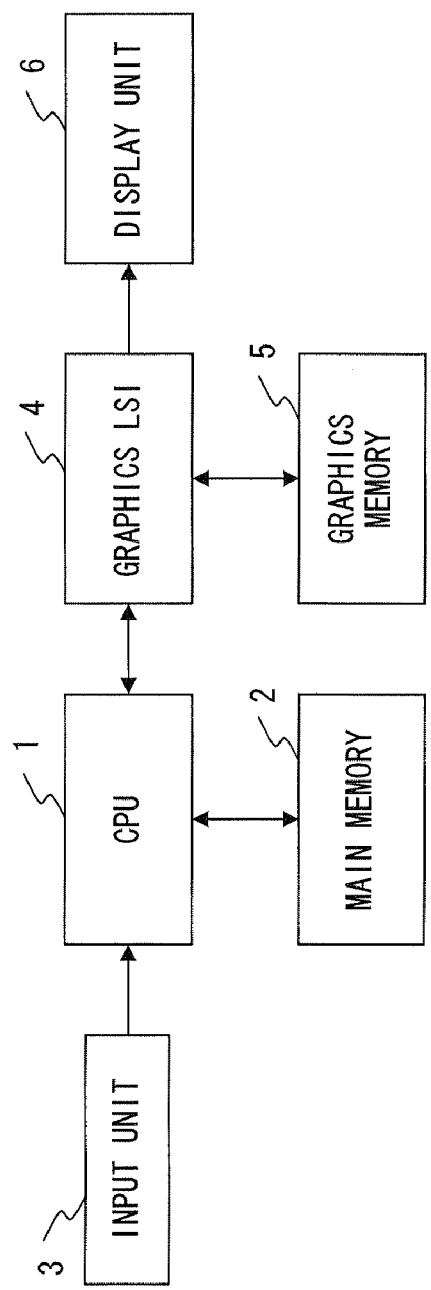
FIG. 1 is a block diagram illustrating an entire graphics system according to the first embodiment.

Hereinafter, the embodiments of the present invention will be explained by referring to the drawings.

First Embodiment

FIG. 1 is a block diagram illustrating an entire graphics system according to the first embodiment of the present invention.

As illustrated in FIG. 1, the graphics system according to the present embodiment is configured to include a CPU 1 controlling the operations of the entire system, main memory 2 used as a working area or the like for the execution of the controlling processes by the CPU 1, an input unit 3 for inputting instructions and data from the users (such as the programmers), a graphics LSI 4 for performing drawing processes under the control of the cup 1, graphics memory 5 used for the drawing processes by the graphics LSI 4, and a display unit 6 for displaying, on the screen, the content drawn in a frame buffer area in the graphics memory 5.

Figure 9:
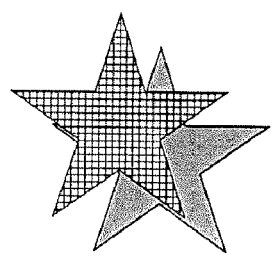
FIG. 9 illustrates an example of expressing the shadow of a two-dimensional figure.
Figure 10:
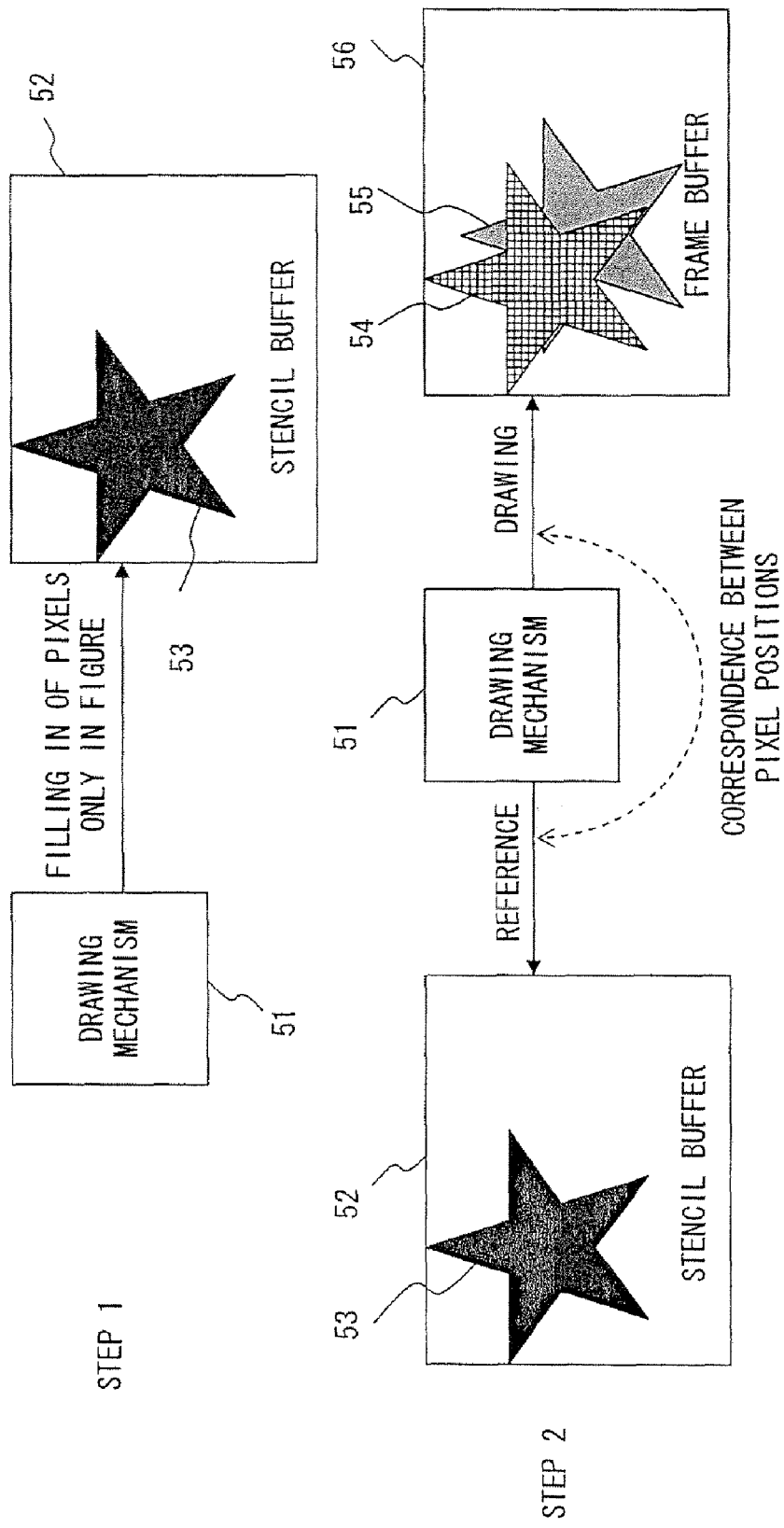
FIG. 10 illustrates an example of a drawing method for expressing the shadow of a two-dimensional figure.
Figure 11:
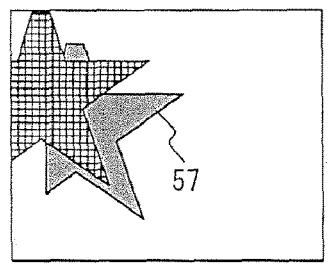
FIG. 11 illustrates an exemplary case where a shadow is generated with a portion omitted.
Figure 12:
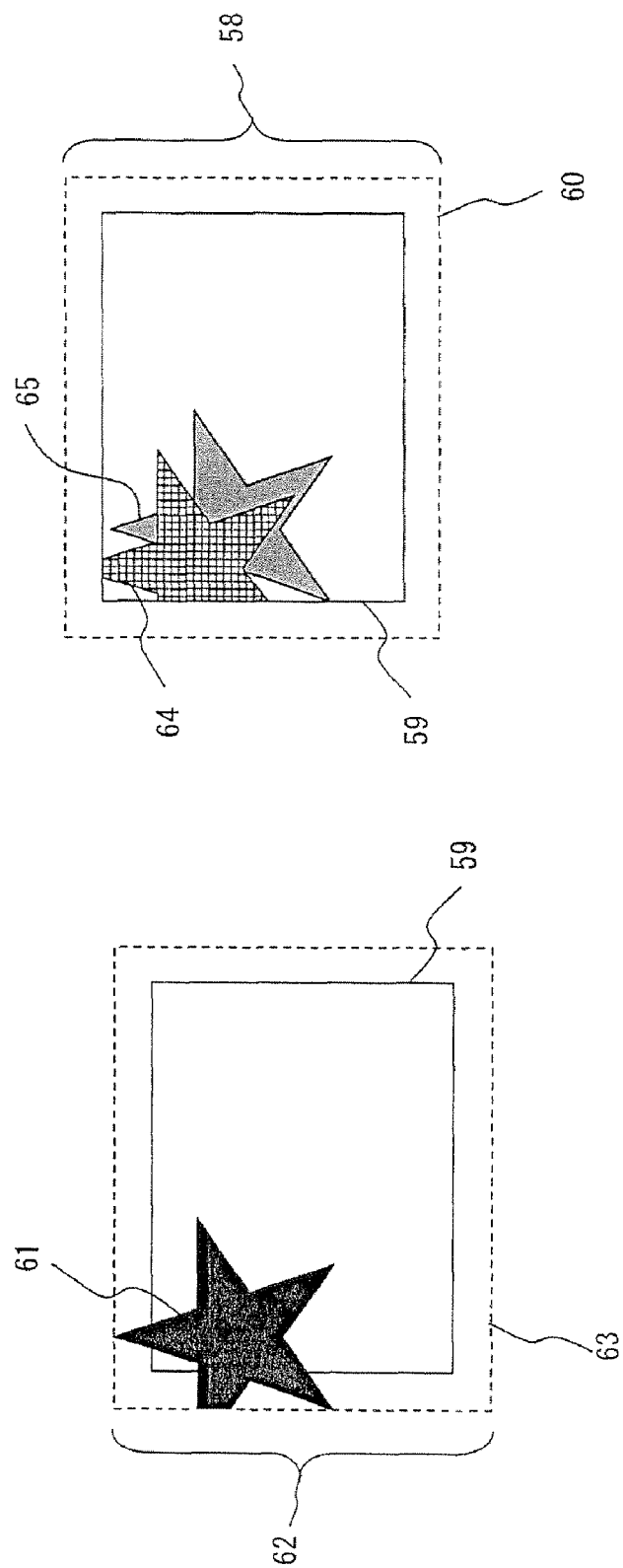
FIG. 12 illustrates an example of drawing when frame buffer size is larger than the screen size.
Figure 13:
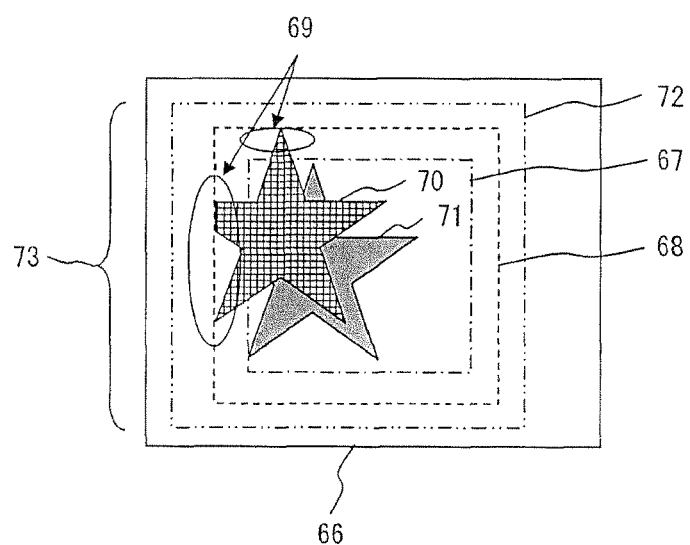
FIG. 13 illustrates an example of drawing when figures are drawn only in a partial area smaller than the screen size.

The graphics system in the above configuration can perform multiple drawing, in which identical subjects are drawn offset by a prescribed distance, such as in FIG. 9 illustrating the expression of the shadow of a two-dimensional figure. Here, the configurations of the graphics LSI 4 and the graphics memory 5 will be explained in more detail as the configurations of the main components implementing the multiple drawing as described above. In the present embodiment, explanations will be given using figures as examples of the drawing subjects.

Figure 2:
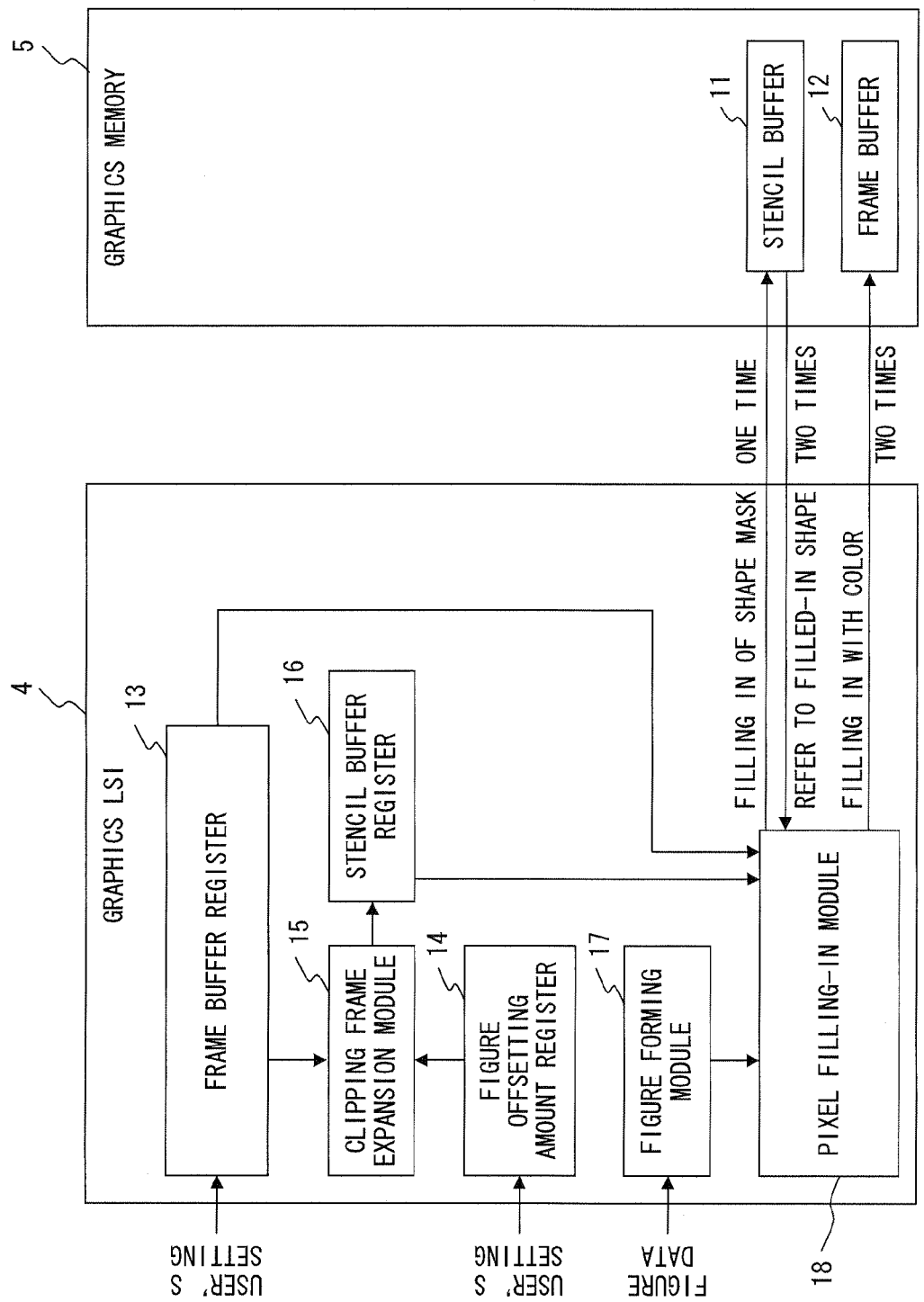
FIG. 2 is a block diagram illustrating in more detail the configurations of a graphics LSI and graphics memory according to the first embodiment.

FIG. 2 is a block diagram illustrating the above configuration in more detail.

As illustrated in FIG. 2, the graphics memory 5 includes a stencil buffer area (referred to as a "stencil buffer" hereinafter) 11 and a frame buffer area (referred to as a "frame buffer" hereinafter) 12. The stencil buffer 11 is a buffer area storing information specifying, in units of pixels, whether or not permission to perform the drawing should be given. The frame buffer 12 is a buffer area storing raster data for an image to be displayed on the display unit 6. Note that the stencil buffer 11 and the frame buffer 12 are equal in buffer size (this does not mean equality in the total number of bits, but equality in the number of pixels). The present embodiment is based on the assumption that the above buffer size is used also to express the screen size of the display unit 6.

In the graphics LSI 4, a frame buffer register 13 stores data for defining a clipping frame of the frame buffer 12 (referred to as a "frame buffer clipping frame"), which was set by the user using the input unit 3 in accordance with the application. The frame buffer clipping frame is a frame for defining the drawing area on the frame buffer 12. In other words, the area within the frame buffer clipping frame on the frame buffer 12 is the drawing area on the frame buffer 12.

A figure offsetting amount register 14 stores data of the figure offsetting amount set by the user using the input unit 3 according to the application. The figure offsetting amount also defines the direction of offsetting of the figures by its sign.

A clipping frame expansion module 15 automatically calculates data for defining the clipping frame of the stencil buffer 11 (referred to as a "stencil buffer clipping frame" hereinafter) from the data stored in the frame buffer register 13 and the data stored in the figure offsetting amount register 14. The stencil buffer clipping frame is a frame for defining the drawing area on the stencil buffer 11. In other words, the area in the stencil buffer clipping frame on the stencil buffer 11 is the drawing area on the stencil buffer 11. The clipping frame expansion module 15 automatically calculates, from the data stored in the frame buffer register 13 or the data and data stored in the figure offsetting amount register 14, data of the coordinates as the basing point (referred to as "reference basing point coordinates" hereinafter) of a reference area of the stencil buffer 11 (referred to as a "stencil buffer reference area" hereinafter) for drawing a non-offset figure or an offset figure onto the frame buffer 12.

A stencil buffer register 16 stores data for defining a stencil buffer clipping frame and data of reference basing point coordinates that were calculated by the clipping frame expansion module 15.

A figure forming module 17 forms a figure to be drawn on the basis of the figure data that was input.

A pixel filling-in module 18 performs a process of filling in particular pixels on the stencil buffer 11, and of filling in particular pixels on the frame buffer 12 with a particular color, etc. More specifically, the pixel filling-in module 18 draws a determination result of whether or not a pixel is included in the figure that was formed by the figure forming module 17 and that was cut out by the stencil buffer clipping frame (masking determination result). In other words, the pixel filling-in module 18 fills in pixels included only in the figure (filling-in of shape mask). Also, the pixel filling-in module 18 refers to the data stored in the frame buffer register 13, the data stored in the stencil buffer register 16, and the stencil buffer 11 in which a pixel included only in the figure was filled in, and draws a non-offset figure on the frame buffer 12. In other words, the pixel filling-in module 18 fills in the pixel included only in the figure with a particular color. Further, the pixel filling-in module 18 refers to the data stored in the frame buffer register 13, the data stored in the stencil buffer register 16, and the stencil buffer 11 in which the pixel included only in the figure was filled in, and draws an offset figure onto the frame buffer 12. In other words, the pixel filling-in module 18 fills in the pixel included only in the figure with a particular color.

In the configuration above, the pixel filling-in module 18 performs drawing onto the stencil buffer 11, refers to the stencil buffer 11, and performs drawing onto the frame buffer 12 at least one time, two times, and two times, respectively, and thereby the shadow of a two-dimensional figure can be expressed.

Figure 3:
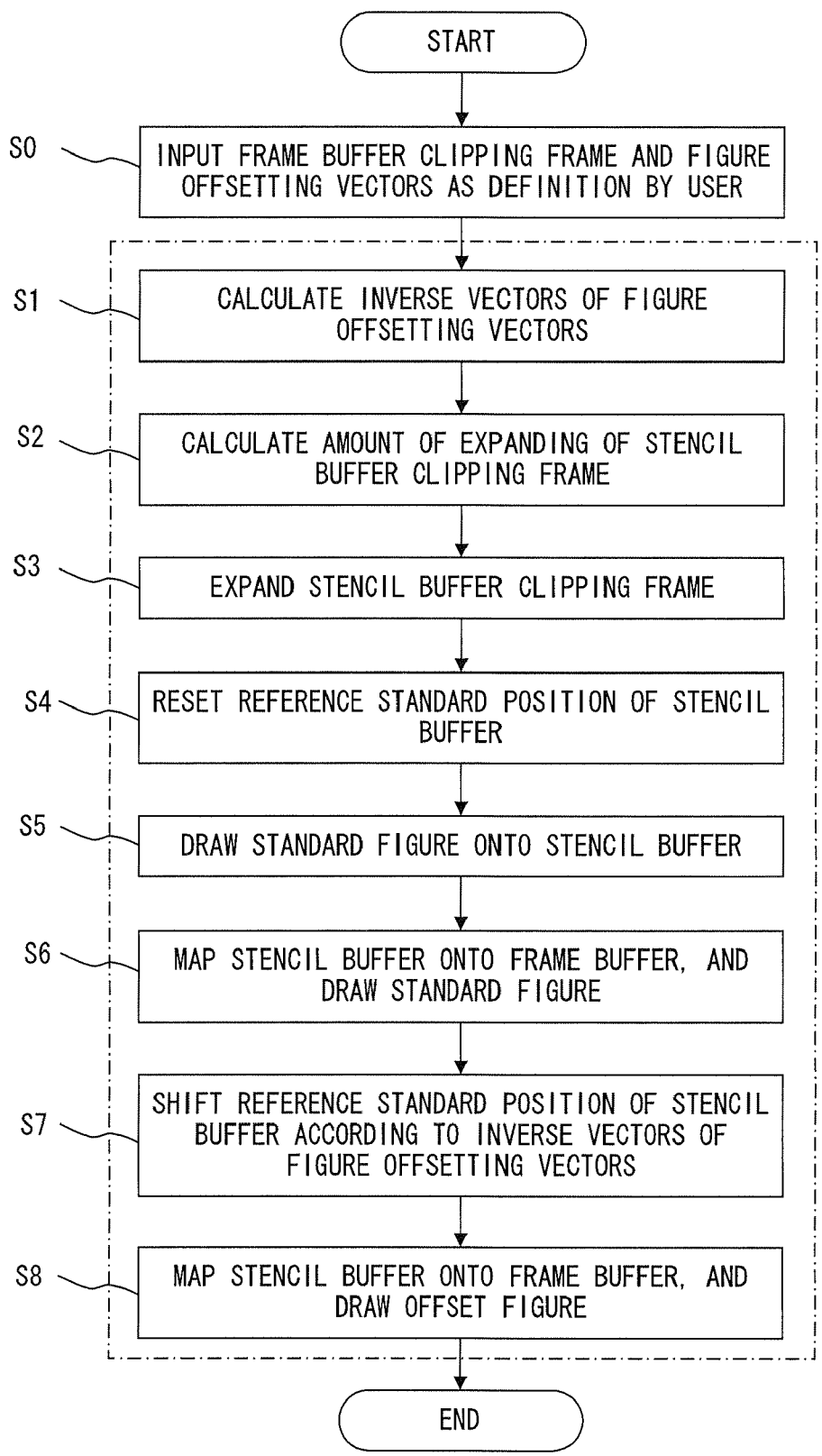
FIG. 3 is a flowchart illustrating the operations for expressing the shadow of a two-dimensional figure according to the first embodiment.
Figure 4A:
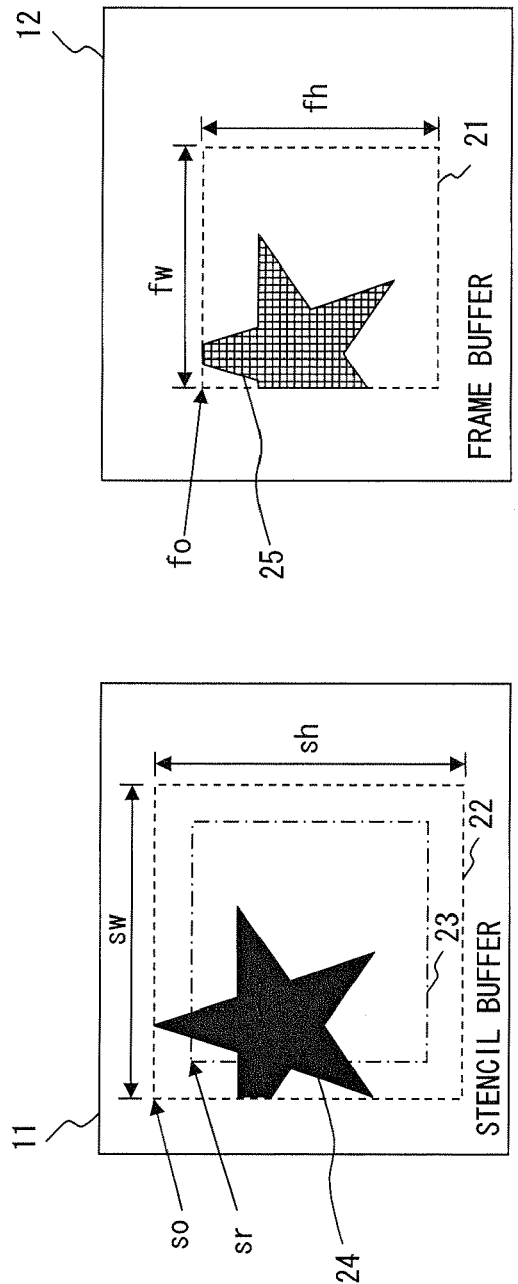
FIG. 4A schematically illustrates a specific example of drawing the main body of a two-dimensional figure according to the first embodiment.
Figure 4B:
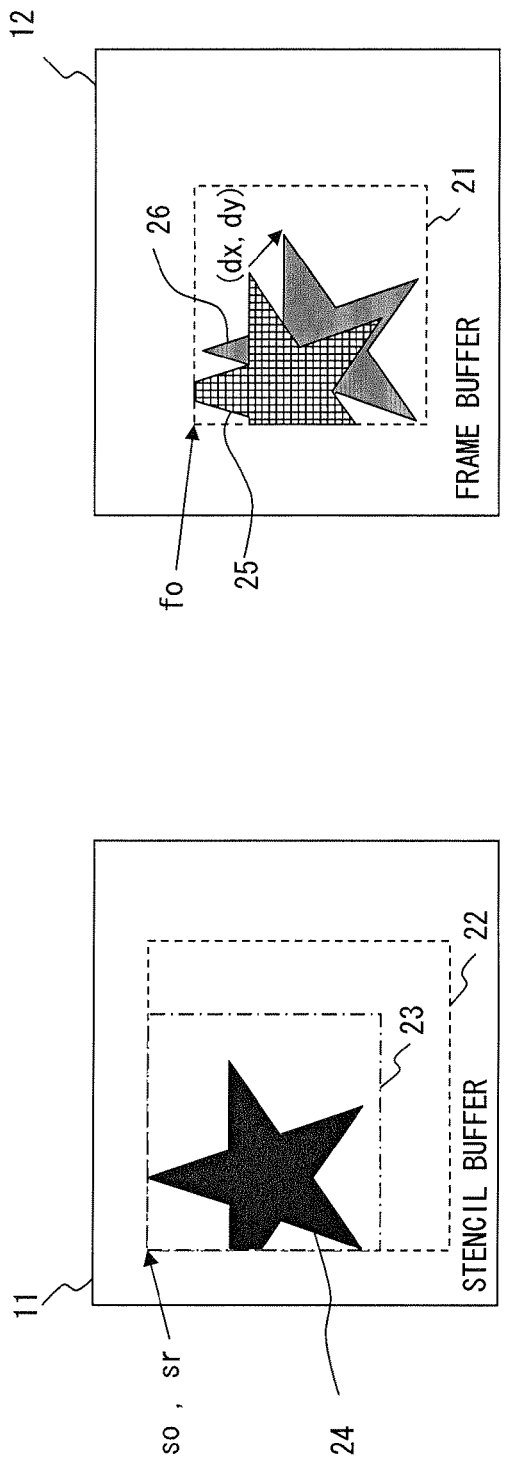
FIG. 4B schematically illustrates a specific example of drawing the shadow of a two-dimensional figure according to the first embodiment.

FIG. 3 is a flowchart illustrating the operations for expressing the shadow of a two-dimensional figure. FIGS. 4A and 4B schematically illustrate specific examples of those operations. FIG. 4A schematically illustrates a specific example of drawing the main body of a two-dimensional figure, and FIG. 4B schematically illustrates a specific example of drawing the shadow of the two-dimensional figure. In these examples, in order to facilitate understanding, the flowchart illustrated in FIG. 3 is explained with reference to the specific examples illustrated in FIGS. 4A and 4B. The flowchart illustrated in FIG. 3 is for one of the processes performed during the execution of a prescribed application in the graphics system. Also, regarding the stencil buffer 11 and the frame buffer 12 respectively in FIGS. 4A and 4B, the pixel coordinates at the upper left corner in on the buffer are the origin (0, 0), and the rightward direction is the +X direction while the downward direction is the +Y direction.

As illustrated in FIG. 3, the operations (the operations enclosed by the chain line, which are executed after the operation in step (referred to as "S" hereinafter) 1) are executed after the definition, by the user, of the frame buffer clipping frame and the figure offsetting vectors. Specifically, data (values) for defining the frame buffer clipping frame and the figure offsetting vectors first input by the user using the input unit 3, and the corresponding pieces of the data, are stored respectively in the frame buffer register 13 and the figure offsetting amount register 14 (S0).

In the present embodiment, the clipping frame standard point coordinates fo, the clipping frame width fw, and the clipping frame height fh are input as data defining the frame buffer clipping frame, and the input data is stored in the frame buffer register 13. In the frame buffer register 13 illustrated in FIG. 4A, an example of the storing of the above data is illustrated. Those fo, fw, and fh correspond respectively to fo, fw, and fh of a frame buffer clipping frame 21 on the frame buffer 12 illustrated in FIG. 4A. Also, as the data defining the figure offsetting vectors, dx and dy are input as the offsetting amounts in the X and Y directions respectively, and they are stored in the figure offsetting amount register 14. Note that the offsetting amounts dx and dy also define the offsetting directions of X and Y by their signs as was described above. Also, the offsetting amounts that are input and stored do not exceed the maximum offsetting amounts, which specify the maximum offsetting amounts that can be set in this system. In the figure offsetting amount register 14 illustrated in FIG. 4A, an example of the storing of the above data is illustrated.

The data for defining the frame buffer clipping frame 21 and the data for defining the figure offsetting vectors can be changed as needed during the execution of the application, and the drawing can be performed again (re-execution of the processes after S1).

When the operations start with the frame buffer clipping frame 21 and the figure offsetting vectors defined, the inverse vectors of the stored figure offsetting vectors (figure offsetting amounts dx and dy) are calculated (S1 in FIG. 3).

Next, the amount of expansion of the stencil buffer clipping frame is calculated from the inverse vectors calculated in S1 (S2), and the stencil buffer clipping frame is expanded according to the calculated expansion amount (S3). Specifically, the clipping frame expansion module 15 automatically calculates the clipping frame standard point coordinates so, the clipping frame width sw, and the clipping frame height sh as the data for defining the expanded stencil buffer clipping frame, and stores the calculated data in the stencil buffer register 16. The stencil buffer register 16 illustrated in FIG. 4A illustrates an example of the storing. Those so, sw, and sh correspond respectively to so, sw, and sh of a stencil buffer clipping frame 22 on the stencil buffer 11 illustrated in FIG. 4A, and are automatically calculated by using the formulas below.

$$so = fo - (|dx|, |dy|)$$

$$sw = fw + 2*|dx|$$

$$sh = fh + 2*|dy|$$

Next, the reference standard position of the stencil buffer 11 is reset (S4 in FIG. 3). Specifically, the reference basing point coordinates sr for drawing a non-offset figure are calculated by the clipping frame expansion module 15 using the formula below.

$$sr = fo$$

Thereafter, the reference basing point coordinates sr are stored in the stencil buffer register 16. The stencil buffer register 16 in FIG. 4A illustrates an example of this storing. Also, a stencil buffer reference area of the same size as the frame buffer clipping frame 21 is defined by the reference basing point coordinates sr. The stencil buffer reference area 23 defined by the reference basing point coordinates sr is illustrated on the stencil buffer 11 in FIG. 4A. In this state (i.e., a state in which sr=fo, which is also called a standard state), the stencil buffer reference area 23 and the area of the frame buffer clipping frame 21 are identical to each other in terms of pixel coordinates.

Next, a standard figure (stencil mask figure) is drawn onto the stencil buffer 11 (S5 in FIG. 3). Specifically, the pixel filling-in module 18 draws a result of determination (masking determination result) of whether or not the pixel is included in the figure that was formed by the figure forming module 17 and that was cut out by a stencil buffer clipping frame 22. Specifically, the pixels included only in the figure are filled in. The stencil buffer 11 illustrated in FIG. 4A illustrates an example of drawing a stencil mask figure 24.

Next, the stencil buffer 11 is mapped onto the frame buffer 12, and the standard figure (main body of the figure) is drawn onto the frame buffer 12 (S6 in FIG. 3). Specifically, the pixel filling-in module 18 refers to the data stored in the frame buffer register 13 and the data stored in the stencil buffer register 16, and also refers to the stencil buffer 11. Then, the pixel filling-in module 18 extracts the shape of the figure in the stencil buffer reference area 23, makes the stencil buffer reference area 23 and the frame buffer clipping frame 21 correspond to each other (makes the reference basing point coordinates sr and the standard point coordinates fo of the frame buffer clipping frame 21 correspond to each other), and draws the main body of the figure (the non-offset figure) onto the frame buffer 12. Specifically, the pixels included only in the main body of the figure are filled in with a particular color (the color of the main body of the figure). The frame buffer 12 in FIG. 4A illustrates an example of drawing the main body 25 of the figure.

Next, the reference standard position of the stencil buffer 11 is shifted according to the inverse vectors of the figure offsetting vectors (S7 in FIG. 3). Specifically, the reference basing point coordinates sr for drawing the offset figure are calculated by the clipping frame expansion module 15 using the formula below.

$$sr = fo - (dx, dy)$$

Specifically, the figure offsetting amounts (dx, dy), which are stored in the figure offsetting amount register 14, are added with their sign reversed to the frame buffer clipping frame standard point coordinates fo stored in the frame buffer register 13, and the reference basing point coordinates sr obtained by that addition are calculated. Thereafter, the reference basing point coordinates sr stored in the stencil buffer register 16 are updated to the reference basing point coordinates sr obtained by that addition. The stencil buffer register 16 illustrated in FIG. 4B illustrates an example of this update. As the stencil buffer reference area 23 and the frame buffer clipping frame 21 are equal in size, its size is not changed even when the reference basing point coordinates sr are updated.

Next, the stencil buffer 11 is mapped onto the frame buffer 12, and the offset figure (the shadow of the figure) is drawn onto the frame buffer 12 (S8 in FIG. 3). Specifically, the pixel filling-in module 18 refers to the data stored in the frame buffer register 13 and the data stored in the stencil buffer register 16, and also refers to the stencil buffer 11. Then, the pixel filling-in module 18 extracts the shape of the figure in the stencil buffer reference area 23, makes the stencil buffer reference area 23 and the frame buffer clipping frame 21 correspond to each other (i.e., makes the reference basing point coordinates sr and the standard point coordinates fo of the frame buffer clipping frame 21 correspond to each other), and draws the shadow of the figure (the offset figure) onto the frame buffer 12. In other words, the pixels included only in the shadow of the figure are filled in with a particular color (the color of the shadow of the figure) on the frame buffer 12. The frame buffer 12 in FIG. 4B illustrates an example of drawing a shadow 26 of the figure. In this process, the use of the conventional Z-buffer algorithm makes it possible to correctly control the overlapping portion between the main body and the shadow of the figure (hidden surface removal). The Z-buffer algorithm is a method by which the front figure of overlapping figures is drawn without drawing the back one, by using a z buffer storing the depth information of the figure.

The above operations make it possible to correctly draw the main body and the shadow of a figure onto the frame buffer 12 while avoiding including unnecessary portions in the drawing of the main body of a figure or drawing a shadow of a figure with omitted portions.

As described above, according to the present embodiment, clipping frames can be independently provided respectively to the stencil buffer and the frame buffer, and reference basing point coordinates, which determine which of the positions in the clipping frame of the stencil buffer is to be used as the reference basing point for perform the drawing onto the frame buffer, can be set. Thereby, it is possible to draw a main body not including unnecessary portions and shadow not including omissions by securing a large clipping frame of the stencil buffer according to the offsetting amount of the figure, by referring to the stencil buffer reference area defined by the reference basing point coordinates before offsetting according to the offsetting amount when the main body is drawn, and by referring to the stencil buffer reference area defined by the reference basing point coordinates after offsetting according to the offsetting amount when the shadow of the figure is drawn so as to perform the drawing onto the frame buffer.

Second Embodiment

Next, the second embodiment of the present invention will be explained.

A graphics system according to the present embodiment is different from the system in the first embodiment in the manner of performing the process of multiple drawing in which identical subjects are drawn offset by a prescribed distance. Accordingly, the configuration of the graphics LSI 4 is partially different while the configuration of the entire system is the same as that illustrated in FIG. 1.

Figure 5:
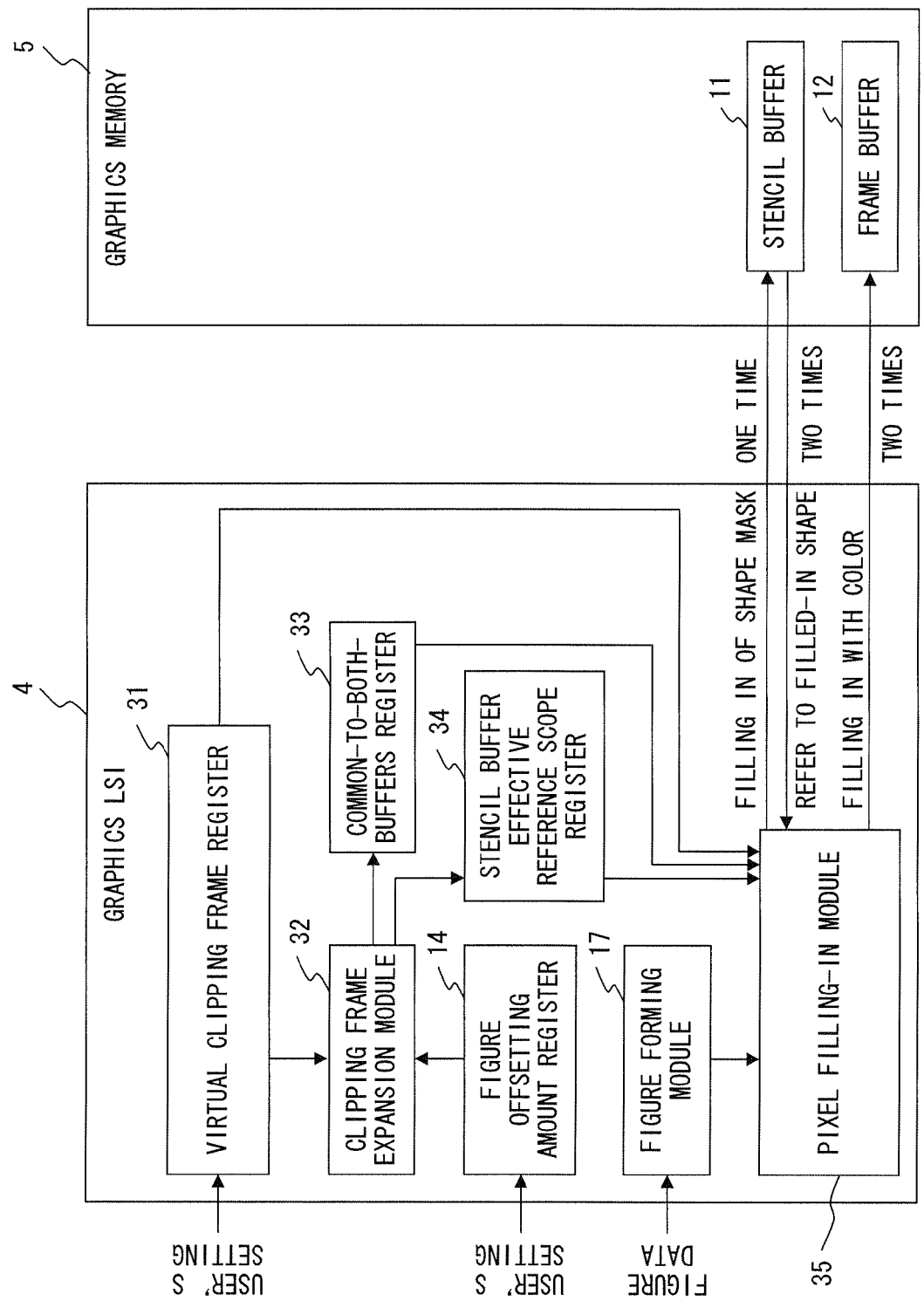
FIG. 5 is a block diagram illustrating in more detail the configurations of the graphics LSI and the graphics memory according to the second embodiment.

FIG. 5 is a block diagram illustrating the configurations of the graphics LSI 4 and the graphics memory 5 according to the present embodiment in more detail. Note that in the present embodiment, explanations will also be given using figures as examples of the drawing subjects.

In FIG. 5, it is assumed that, similarly to the first embodiment, the graphics memory 5 includes the stencil buffer 11 and the frame buffer 12, which are equal in buffer size (this does not mean equality in the total number of bits, but equality in the number of pixels) and that buffer size is also used to express the screen size of the display unit 6.

In the graphics LSI 4, data for defining a virtual clipping frame (referred to as a "frame buffer virtual clipping frame" hereinafter) of the frame buffer 12 set by the user according to an application using the input unit 3 is stored in a virtual clipping frame register 31. A frame buffer virtual clipping frame is a frame used for defining a drawing area set by the user on the frame buffer 12. In other words, the scope within a frame buffer virtual clipping frame on the frame buffer 12 is an intended drawing area of the user.

Similarly to the first embodiment, data of a figure offsetting amount set by the user according to the application by using the input unit 3 is stored in the figure offsetting amount register 14. In the present embodiment as well, a figure offsetting amount also represents the figure offsetting direction by its sign.

A clipping frame expansion module 32 automatically calculates, from the data stored in the virtual clipping frame register 31 and the data stored in the figure offsetting amount register 14, data for defining a common clipping frame of both the stencil buffer 11 and the frame buffer 12. A common clipping frame is a frame used for defining a drawing area that brings about the same area on the stencil buffer 11 and the frame buffer 12. However, an area that is within the common clipping frame on the frame buffer 12 but not within the virtual clipping frame is an area in which drawing is skipped. The area in the common clipping frame on the stencil buffer 11 is the drawing area of the stencil buffer 11. The clipping frame expansion module 32 automatically calculates, from data stored in the virtual clipping frame register 31 or from that data and data stored in the figure offsetting amount register 14, data for defining an effective reference scope of the stencil buffer 11 (referred to as a "stencil buffer effective reference scope" hereinafter), which is a scope being referred to for drawing a non-offset figure or an offset figure.

A common-to-both-buffers register 33 stores data for defining a common clipping frame calculated by the clipping frame expansion module 32.

A stencil buffer effective reference scope register 34 stores data for defining the stencil buffer effective reference scope calculated by the clipping frame expansion module 32.

Similarly to the first embodiment, the figure forming module 17 forms a figure to be drawn on the basis of the figure data that was input.

A pixel filling-in module 35 performs processes such as the filling in of a particular pixel on the stencil buffer 11 and of a particular pixel in the frame buffer 12 with a particular color. More specifically, the pixel filling-in module 35 draws, onto the stencil buffer 11, a result of determination of whether or not a pixel is included in the figure that was formed by the figure forming module 17 and that was cut out by the common clipping frame (masking determination result). In other words, a pixel included only in the figure is filled in (shape mask filling in). The pixel filling-in module 35 refers to the data stored in the stencil buffer effective reference scope register 34, the stencil buffer 11 on which the pixels included only in the figure were filled in, and the data stored in the virtual clipping frame register 31, and draws a non-offset figure on the frame buffer 12. In other words, the pixel included only in the figure is filled in with a particular color. Further, the pixel filling-in module 35 refers to the data stored in the stencil buffer effective reference scope register 34, the stencil buffer 11 on which the pixels included only in the figure were filled in, and the data stored in the virtual clipping frame register 31, and draws an offset figure onto the frame buffer 12. In other words, the pixel included only in the figure is filled in with a particular color.

Similarly to the first embodiment, in the above configuration, the pixel filling-in module 35 performs the drawing onto the stencil buffer 11, refers to the stencil buffer 11, and performs drawing onto the frame buffer 12 at least one time, two times, and two times, respectively, and thereby the shadow of a two-dimensional figure can be expressed.

Figure 6:
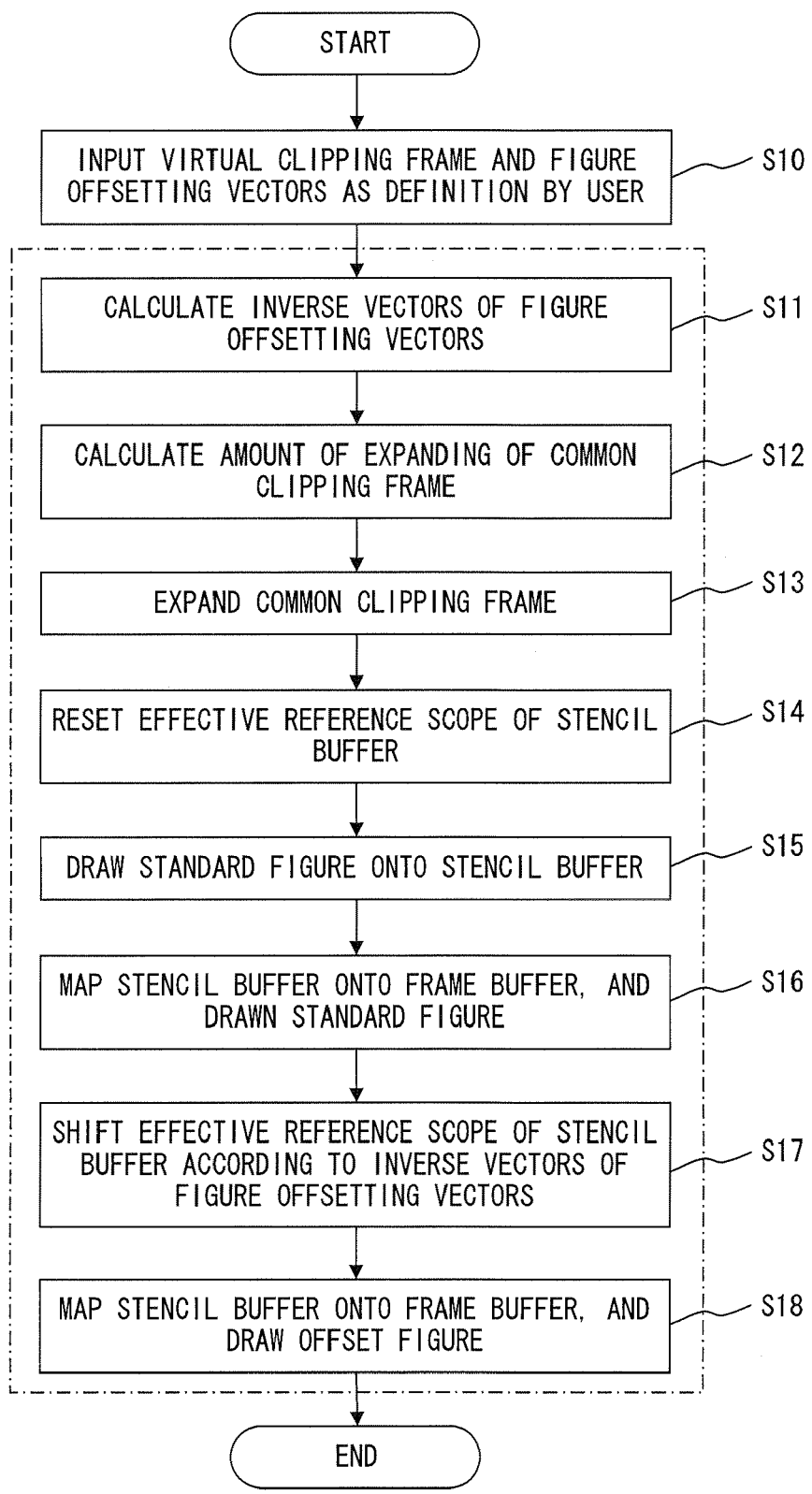
FIG. 6 is a flowchart explaining the operations for expressing the shadow of a two-dimensional figure according to the second embodiment.
Figure 7A:
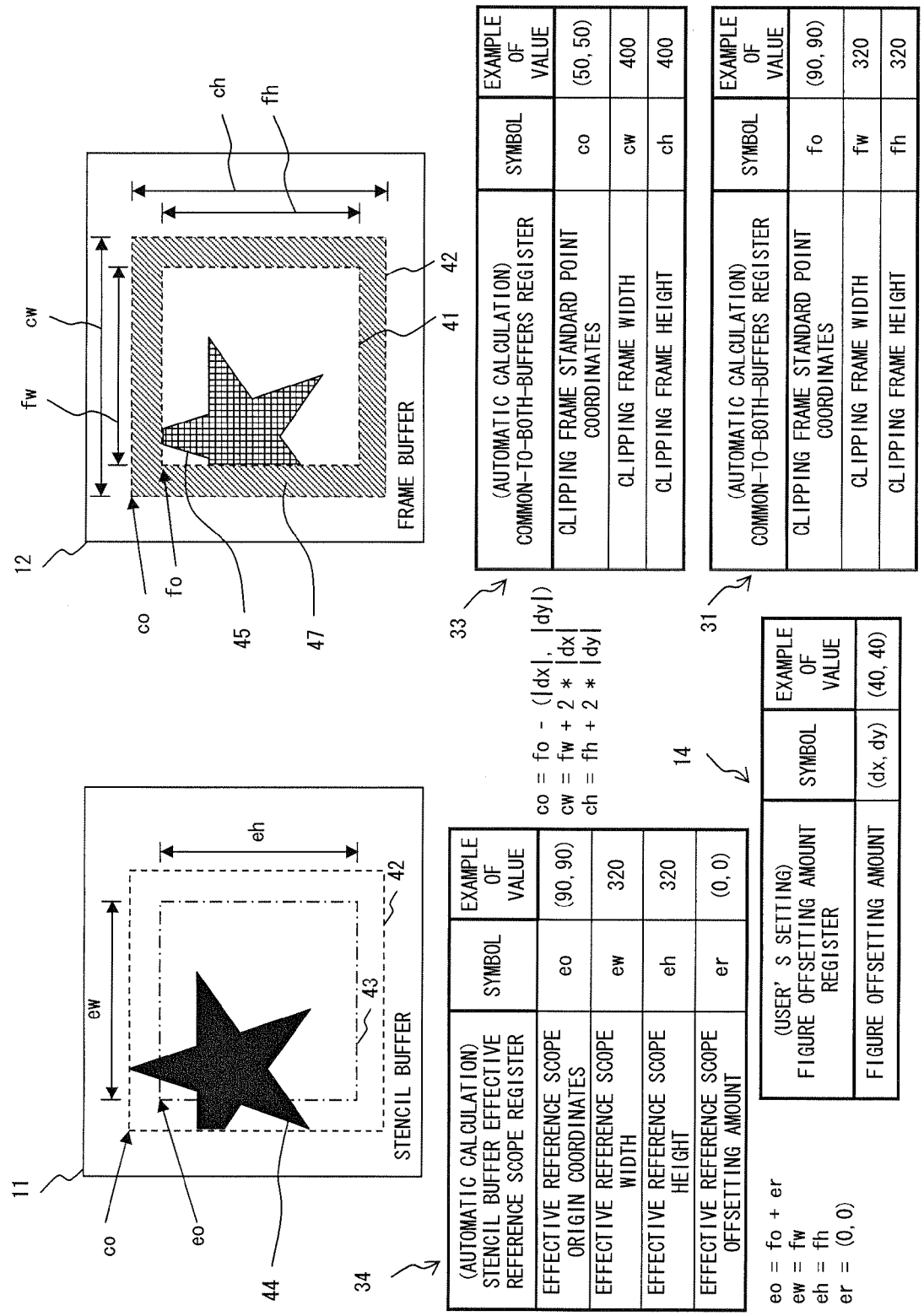
FIG. 7A schematically illustrates a specific example of the drawing of the main body of a two-dimensional figure according to the second embodiment.
Figure 7B:
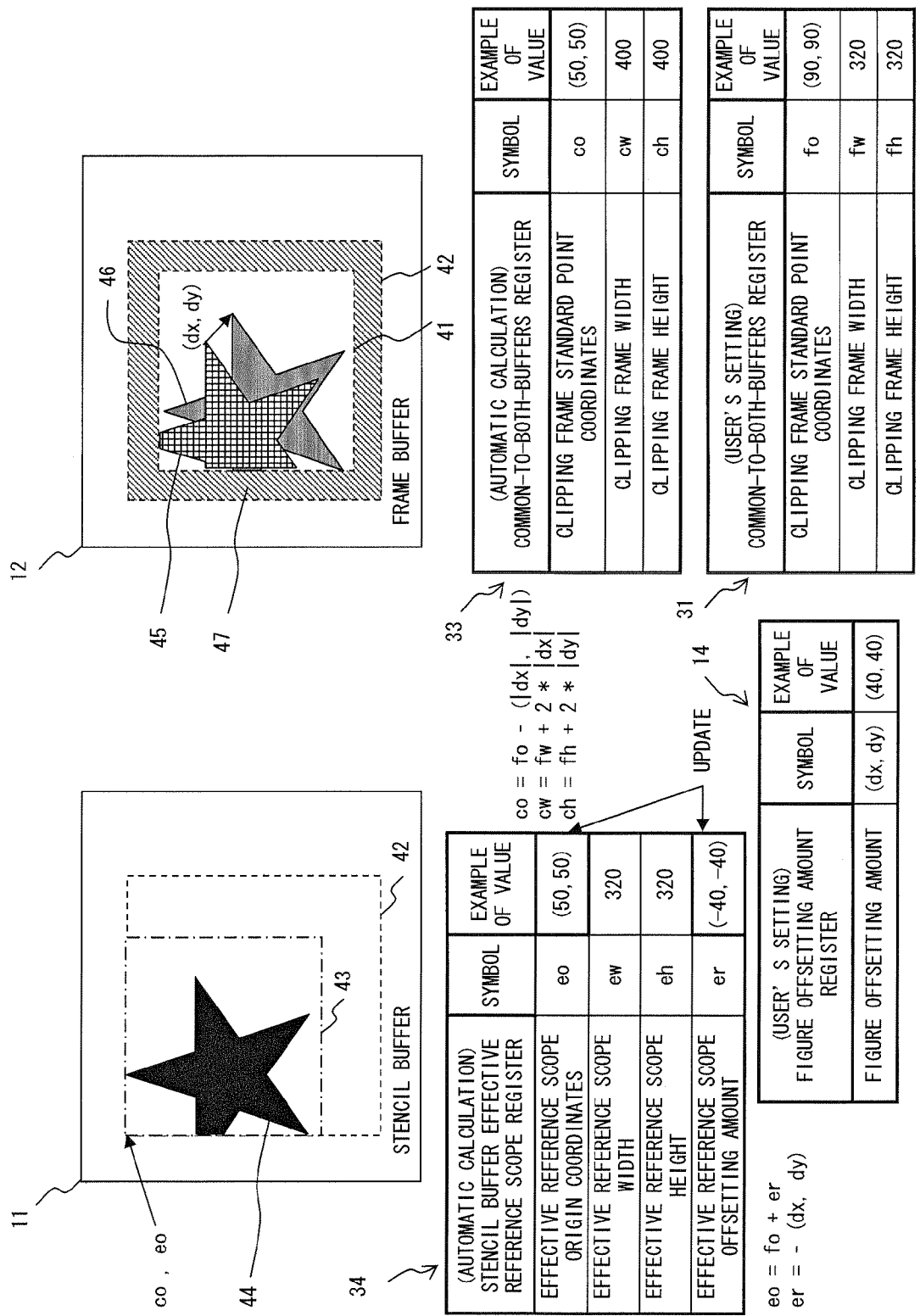
FIG. 7B schematically illustrates a specific example of the drawing of the shadow of a two-dimensional figure according to the second embodiment.

FIG. 6 is a flowchart explaining the above operations for expressing the shadow of a two dimensional figure. FIGS. 7A and 7B schematically illustrate the specific examples of those operations, with FIG. 7A schematically illustrating a specific example of drawing the main body of a two dimensional figure and FIG. 7B schematically illustrating a specific example of drawing the shadow of a two dimensional figure. Herein, the flowchart in FIG. 6 will be explained with reference to the specific examples illustrated in FIGS. 7A and 7B. Note that the flowchart in FIG. 6 is for one of the processes performed during the execution of a prescribed application in the graphics system. In the stencil buffer 11 and the frame buffer 12 illustrated in FIGS. 7A and 7B, the pixel coordinates at the upper left corner are the origin (0, 0), with the rightward direction being the +X direction and the downward direction being the +Y direction.

As illustrated in FIG. 6, the operations (the operations enclosed by the chain line, which are executed after the operation in the step 11) are executed after the definition, by the user, of the virtual clipping frame and the figure offsetting vectors. Specifically, data (values) for defining the frame buffer clipping frame and the figure offsetting vectors are first input by the user using the input unit 3, and the corresponding pieces of the data are stored respectively in the virtual clipping frame register 31 and the figure offsetting amount register 14 (S10).

In the present embodiment, the clipping frame standard point coordinates fo, the clipping frame width fw, and the clipping frame height fh are input as data defining the virtual clipping frame, and the input data is stored in the virtual clipping frame register 31. In the virtual clipping frame register 31 illustrated in FIG. 7A, an example of the storing of the above data is illustrated. Those fo, fw, and fh being input correspond respectively to fo, fw, and fh of a virtual clipping frame 41 on the frame buffer 12 illustrated in FIG. 7A. Also, as the data defining the figure offsetting vectors, dx and dy are input as the offsetting amounts in the X and Y directions respectively, and are stored in the figure offsetting amount register 14. Note, as already described, that the offsetting amounts dx and dy also define the offsetting directions of X and Y by their signs. Also, the offsetting amounts that are input and stored do not exceed the maximum offsetting amounts, which specify the maximum offsetting amounts that can be set in this system. In the figure offsetting amount register 14 illustrated in FIG. 7A, an example of that storing of the above data is illustrated.

Data for defining the virtual clipping frame 41 and data for defining figure offsetting vectors can be updated as needed during the execution of the application, and the drawing can be performed again (re-execution of the processes after S11).

When the operations start with the virtual clipping frame 41 and the figure offsetting vectors are thus defined, the inverse vectors of the stored figure offsetting vectors (figure offsetting amounts dx and dy) are calculated (S11 in FIG. 6).

Next, the amount of the expansion of the common clipping frame is calculated from the inverse vectors calculated in S11 (S12), and the common clipping frame is expanded in accordance with the calculated expansion amount (S13). Specifically, the clipping frame expansion module 32 automatically calculates the clipping frame standard point coordinates co, the clipping frame width cw, and the clipping frame height ch as the data for defining the expanded common clipping frame, and stores the calculated data in the common-to-both-buffers register 33. The common-to-both-buffers register 33 illustrated in FIG. 7A illustrates an example of the storing. Note that co, cw and ch respectively correspond to co, cw, and ch of a common clipping frame 42 illustrated in FIG. 7A (in FIG. 7A, only the common clipping frame 42 on the frame buffer 12 is illustrated), and they are automatically calculated by using the formulas below.

$$co = fo - (|dx|, |dy|)$$

$$cw = fw + 2*|dx|$$

$$ch = fh + 2*|dy|$$

When the data for defining the common clipping frame 42 is stored in the common-to-both-buffers register 33, an area 47 (the area with the oblique lines in FIG. 7A) in the frame buffer 12, which is the area within the common clipping frame 42 but not n within the virtual clipping frame 41, is a drawing omission area in which the drawing is omitted.

Next, the stencil buffer effective reference scope is reset (S14 in FIG. 6). Specifically, among the effective reference scope offsetting amount er, the effective reference scope origin coordinates eo, the effective reference scope width ew, the effective reference scope height eh, and the effective reference scope offsetting amount er, which are the data for setting the stencil buffer effective reference scope, the effective reference scope offsetting amount er is set to zero (er=(0, 0)), i.e., the offsetting amounts in the X and Y directions in the effective reference scope are set to zero, and eo, ew, and eh are calculated automatically, and er, eo, ew, and eh are stored in the stencil buffer effective reference scope register 34. Thereby, data for defining the stencil buffer effective reference scope for drawing a non-offset figure is stored in the stencil buffer effective reference scope register 34. The stencil buffer effective reference scope register 34 illustrated in FIG. 7A illustrates an example of the storing. Those eo, ew, and eh correspond to eo, ew, and eh of a stencil buffer effective reference scope 43 on the stencil buffer 11 illustrated in FIG. 7A, and are calculated automatically by using the formulas below.

$$eo = fo + er$$

$$ew = fw$$

$$eh = fh$$

In this state (the state in which er=(0, 0), which is also referred to as a normal state), the area in the stencil buffer effective reference scope and the area in the virtual clipping frame correspond to each other in terms of pixel coordinates.

Next, a standard figure (stencil mask figure) is drawn onto the stencil buffer 11 (S15 in FIG. 6). Specifically, the pixel filling-in module 35 draws a result of determination (masking determination result) of whether or not a pixel is included in the figure that was formed by the figure forming module 17 and that was cut out by the common clipping frame 42 is drawn onto the stencil buffer 11. In other words, pixels included only in the figure are filled in. The stencil buffer 11 in FIG. 7A illustrates an example of drawing a stencil mask figure 44.

Next, the stencil buffer 11 is mapped onto the frame buffer 12, and a standard figure (main body of the figure) is drawn onto the frame buffer 12 (S16 in FIG. 6). Specifically, the pixel filling-in module 35 refers to data stored in the stencil buffer effective reference scope register 34, the stencil buffer 11, and data stored in the virtual clipping frame register 31, extracts the shape of the figure in the stencil buffer effective reference scope 43, makes the stencil buffer effective reference scope 43 and the virtual clipping frame 41 correspond to each other (i.e., makes the effective reference scope origin coordinates eo and the virtual clipping frame standard point coordinates fo correspond to each other), and draws the main body of the figure (a non-offset figure) onto the frame buffer 12. In other words, the pixels included only in the main body of the figure are filled in with a particular color (the color of the main body of the figure). The frame buffer 12 illustrated in FIG. 7A illustrates an example of drawing a main body 45 of the figure.

Next, the stencil buffer effective reference scope 43 is shifted according to the inverse vectors of the figure offsetting vectors (S17 in FIG. 6). Specifically, the clipping frame expansion module 32 calculates the effective reference scope origin coordinates eo and the effective reference scope offsetting amount er by using the formulas below.

$$eo = fo + er$$

$$er = -(dx, dy)$$

Then, the effective reference scope origin coordinates eo and the effective reference scope offsetting amount er stored in the stencil buffer effective reference scope register 34 are updated to calculated eo and er. In the stencil buffer effective reference scope register 34 illustrated in FIG. 7B, an example of the updating is illustrated. Also, because the stencil buffer effective reference scope register 34 and the originally intended drawing area are equal in size, there will be no change in the effective reference scope width ew or the effective reference scope height eh even when eo and er are updated. Thereby, the stencil buffer effective reference scope register 34 stores data for defining the stencil buffer effective reference scope for drawing an offset figure.

Next, the stencil buffer 11 is mapped onto the frame buffer 12, and an offset figure (the shadow of the figure) is drawn (S18 in FIG. 6). Specifically, the pixel filling-in module 35 refers to data stored in the stencil buffer effective reference scope register 34, the stencil buffer 11, and data stored in the virtual clipping frame register 31, extracts the shape of the figure in the stencil buffer effective reference scope 43, makes the stencil buffer effective reference scope 43 and the virtual clipping frame 41 correspond to each other (makes the effective reference scope origin coordinates eo and the virtual clipping frame standard point coordinates fo correspond to each other), and draws the shadow of the figure (the offset figure) onto the frame buffer 12. In other words, the pixels included only in the figure are filled in with a particular color (the color of the shadow of the figure). The frame buffer 12 illustrated in FIG. 7B illustrates an example of the drawing of a shadow 46 of the figure. In this process, similarly to the first embodiment, the use of the Z-buffer algorithm makes it possible to correctly control the overlapping portion between the main body and the shadow of the figure (hidden surface removal).

The above operations make it possible to correctly draw the main body and the shadow of the figure onto the frame buffer 12 while avoiding including unnecessary portions in the drawing of the main body of a figure or drawing a shadow of a figure with omitted portions.

As described above, according to the present embodiment, even in a configuration that cannot set an independent clipping frame respectively for a stencil buffer and a frame buffer, it is possible to draw the main body not including unnecessary portions and to draw a shadow not including omitted portions by securing a large clipping frame according to the figure offsetting amount, by setting an effective reference scope in the stencil buffer to avoid the drawing onto the frame buffer for an area out of the effective reference scope, by referring to the effective reference scope before the offsetting according to the figure offsetting amount when the main body of a figure is drawn, and by the referring to the effective reference scope after the offsetting according to the figure offsetting amount when the shade of the figure is drawn so as to perform the drawing onto the frame buffer.

Although the above embodiments 1 and 2 first draw the main body of a figure, and thereafter draw the shadow of the figure as described in the explanation of FIGS. 3 and 6, a different order can be employed so that, for example, the shadow of a figure is first drawn, and thereafter the main body of the figure is drawn. This order is advantageous when, for example, the shadow of a figure has to be first drawn in order to achieve a correct effect of mixing colors for special purposes such as the drawing of semitransparent figures.

Also, although in the above embodiments 1 and 2 the four corners of the clipping frame are moved outwardly by the same distance in order to expand the clipping frame as described in the explanation of S13 in FIG. 3 and S13 in FIG. 6, the manner of expanding a clipping frame is not limited to this, and it is also possible to employ the manner of expansion, for example as illustrated in FIG. 8. In FIG. 8, the clipping frame is expanded only to minimum necessary directions and only to a minimum necessary degree. In this example, the four corners of the clipping frame are moved respectively in different ways according to whether the values of the figure off setting amounts dx and dy are positive or negative. When, for example, the figure offsetting amounts dx and dy are both positive (dx>0, dy>0), the variations of the coordinate values between before and after the expansion of the clipping frame are (−dx, −dy), (−dx, 0), (0, −dy), and (0, 0) for the upper left corner, the lower left corner, the upper right corner, and the lower right corner, respectively. In that case, the variation of the clipping frame standard point coordinates fo between before and after the expansion is (−dx, −dy). Note that the normal position in FIG. 8 is the position of the clipping frame before the expansion. Also, the normal values are the coordinate values of the clipping frame standard point coordinates fo.

Although the buffer size of the stencil buffer 11 and the frame buffer 12 are the same as the screen size of the display unit 6 in the above embodiments 1 and 2, they may be different from each other. For example, their buffer size may be greater than the screen size, and this configuration is advantageous in cases in which images are scrolled Also, explanations have been given using figures as examples of subjects of drawing in the above embodiments 1 and 2; however, other types of subjects such as characters or the like may be used.

Hereinabove, the invention has been explained in detail; however, the scope of the invention is not limited to the above embodiments, and naturally, various alterations and modifications are allowed without departing from the spirit of the invention.

As described above, according to the present invention, it is possible to perform the process of multiple drawing in which identical subjects are drawn offset by a prescribed distance, such as for expressing the shadow of a two-dimensional figure, while preventing the chipping of a portion of the figure and the drawing of unnecessary portions.

What is claimed is:

1. A graphics system that performs a process of multiple drawing in which identical drawing subjects are drawn offset by a prescribed distance, comprising:

frame buffer clipping frame data storage means for storing frame buffer clipping frame data defining a clipping frame of a frame buffer;

offset data storage means for storing offset data defining an offsetting direction and an offsetting amount of the drawing subject;

stencil buffer clipping frame data storage means for storing stencil buffer clipping frame data defining a clipping frame that is a clipping frame of a stencil buffer and that is larger than the clipping frame of the frame buffer;

position data storage means for storing position data of a position functioning as a reference basing point, on the stencil buffer, for drawing the non-offset drawing subject or the offset drawing subject onto the frame buffer;

first drawing means for drawing a masking determination result of a pixel relating to the drawing subject onto the stencil buffer on the basis of the drawing subject and the stencil buffer clipping frame data; and second drawing means for drawing the non-offset drawing subject or the offset drawing subject onto the frame buffer by referring to the stencil buffer onto which the first drawing means drew the subject, the position data, and the frame buffer clipping frame data.

2. The graphics system according to claim 1, wherein:

the stencil buffer clipping frame data is calculated on the basis of the frame buffer clipping frame data and the offset data.

3. The graphics system according to claim 1, wherein:

the position data of a position functioning as a reference basing point, on the stencil buffer, for drawing onto the frame buffer the non-offset drawing subject is determined in accordance with the frame buffer clipping frame data; and the position data of a position functioning as a reference basing point, on the stencil buffer, for drawing onto the frame buffer the offset drawing subject is calculated on the basis of the frame buffer clipping frame data and the offset data.

4. The graphics system according to claim 1, wherein:

the position functioning as a reference basing point on the stencil buffer is a position in the clipping frame of the stencil buffer.

5. The graphics system according to claim 1, further comprising:

input means for inputting the frame buffer clipping frame data and the offset data.

6. A graphics system that performs a process of multiple drawing in which identical drawing subjects are drawn offset by a prescribed distance, comprising:

virtual clipping frame data storage means for storing virtual clipping frame data defining a virtual clipping frame of a frame buffer;

offset data storage means for storing offset data defining an offsetting direction and an offsetting amount of the drawing subject;

common clipping frame data storage means for storing common clipping frame data defining a clipping frame that is common to the frame buffer and the stencil buffer and that is larger than the virtual clipping frame;

scope data storage means for storing scope data of a scope functioning as a reference scope, on the stencil buffer, for drawing the non-offset drawing subject or the offset drawing subject onto the frame buffer;

first drawing means for drawing a masking determination result of a pixel relating to the drawing subject onto the stencil buffer on the basis of the drawing subject and the common clipping frame data; and second drawing means for drawing the non-offset drawing subject or the offset drawing subject onto the frame buffer by referring to the stencil buffer onto which the first drawing means drew the subject, the scope data, and the virtual clipping frame data.

7. The graphics system according to claim 6, wherein:
the common clipping frame data is calculated on the basis of the virtual clipping frame data and the offset data.

8. The graphics system according to claim 6, wherein:
the scope data of a scope functioning as a reference scope, on the stencil buffer, for drawing onto the frame buffer the non-offset drawing subject is determined in accordance with the virtual clipping frame data; and
the scope data of a scope functioning as a reference scope, on the stencil buffer, for drawing onto the frame buffer the offset drawing subject is calculated on the basis of the virtual clipping frame data and the offset data.

9. The graphics system according to claim 6, wherein:
the scope functioning as the reference scope on the stencil buffer is a scope in the clipping frame of the stencil buffer.

10. The graphics system according to claim 6, further comprising:
input means for inputting the virtual clipping frame data and the offset data.

11. The graphics system according to claim 1 or 6, wherein:
the drawing subject is a figure, and the offset drawing subject drawn onto the frame buffer is expressed as a shadow of the figure.

12. A drawing method for a graphics system that performs a process of multiple drawing in which identical drawing subjects are drawn offset by a prescribed distance, comprising:
inputting frame buffer clipping frame data defining a clipping frame of a frame buffer and offset data defining an offsetting direction and an offsetting amount of the drawing subject;
calculating stencil buffer clipping frame data defining a clipping frame that is a clipping frame of a stencil buffer and that is larger than the clipping frame of the frame buffer on the basis of the frame buffer clipping frame data and the offset data;
drawing a masking determination result of a pixel relating to the drawing subject onto the stencil buffer on the basis of the drawing subject and the stencil buffer clipping frame data; and
drawing the non-offset drawing subject onto the frame buffer by referring to position data of a position functioning as a reference basing point, on the stencil buffer, for drawing the non-offset drawing subject onto the frame buffer, the stencil buffer, and the frame buffer clipping frame data, and also drawing the offset drawing subject onto the frame buffer by referring to position data of a position functioning as a reference basing point, on the stencil buffer, for drawing the offset drawing subject onto the frame buffer, the stencil buffer, and the frame buffer clipping frame data.

13. The drawing method for a graphics system according to claim 12, comprising:
determining, in accordance with the frame buffer clipping frame data, the position data of a position functioning as a reference basing point, on the stencil buffer, for drawing the non-offset drawing subject onto the frame buffer; and
calculating, on the basis of the frame buffer clipping frame data and the offset data, the position data of a position functioning as a reference basing point, on the stencil buffer, for drawing the offset drawing subject onto the frame buffer.

14. The drawing method for a graphics system according to claim 12, wherein:
the position functioning as the reference basing point on the stencil buffer is a position in the clipping frame of the stencil buffer.

15. The drawing method for a graphics system according to claim 12, wherein:
the drawing subject is a figure, and the offset drawing subject drawn onto the frame buffer is expressed as a shadow of the figure.

* * * * *